(12) United States Patent
Kumar et al.

(10) Patent No.: US 9,718,254 B2
(45) Date of Patent: Aug. 1, 2017

(54) MOISTURE-RESISTANT GYPSUM BOARDS AND SLURRIES FOR MAKING SAME

(71) Applicant: BASF SE, Ludwigshafen (DE)

(72) Inventors: Rajesh Kumar, Riverview, MI (US); Sridhar Iyer, Matthews, NC (US); Christopher Tanguay, Trenton, MI (US); Daniel Niedzwiecki, Trenton, MI (US)

(73) Assignee: BASF SE, Ludwigshafen (DE)

( * ) Notice: Subject to any disclaimer, the term of this patent is extended or adjusted under 35 U.S.C. 154(b) by 400 days.

(21) Appl. No.: 13/893,985

(22) Filed: May 14, 2013

(65) Prior Publication Data

US 2013/0316163 A1    Nov. 28, 2013

Related U.S. Application Data

(60) Provisional application No. 61/646,625, filed on May 14, 2012.

(51) Int. Cl.
| | | |
|---|---|---|
| *B32B 13/04* | (2006.01) | |
| *B05D 1/00* | (2006.01) | |
| *B05D 3/02* | (2006.01) | |
| *B32B 13/12* | (2006.01) | |

(52) U.S. Cl.
CPC ............... *B32B 13/04* (2013.01); *B05D 1/00* (2013.01); *B05D 3/02* (2013.01); *B32B 13/12* (2013.01); *Y10T 428/249968* (2015.04)

(58) Field of Classification Search
None
See application file for complete search history.

(56) References Cited

U.S. PATENT DOCUMENTS

| | | |
|---|---|---|
| 3,333,974 A | 8/1967 | Sherr |
| 3,967,016 A | 6/1976 | Schneller et al. |
| 4,013,701 A | 3/1977 | Jabs et al. |
| 4,153,470 A | 5/1979 | Stahl et al. |
| 4,413,112 A | 11/1983 | Reiff et al. |
| 4,902,348 A | 2/1990 | Kossatz et al. |
| 5,135,805 A | 8/1992 | Sellers et al. |

(Continued)

FOREIGN PATENT DOCUMENTS

| | | |
|---|---|---|
| CN | 1788064 A | 6/2006 |
| JP | S53-145323 A | 12/1978 |

(Continued)

OTHER PUBLICATIONS

English language translated summary for JP S53145323 extracted from Morningside Translations on Feb. 5, 2014, 8 pages.

(Continued)

*Primary Examiner* — Chinessa Golden
(74) *Attorney, Agent, or Firm* — Howard & Howard Attoneys PLLC (57) ABSTRACT

A gypsum board comprises a cover sheet and a gypsum layer disposed on the cover sheet. The gypsum layer comprises the reaction product of an isocyanate, water, and stucco. The isocyanate increases the moisture resistance of the gypsum board. A method of manufacturing the gypsum board comprises the steps of combining the isocyanate, the water, and the stucco to form a slurry, and applying the slurry to a cover sheet to form the gypsum layer on the cover sheet.

24 Claims, 1 Drawing Sheet

(56) References Cited

U.S. PATENT DOCUMENTS

| | | | |
|---|---|---|---|
| 5,344,490 | A | 9/1994 | Roosen et al. |
| 5,719,200 | A | 2/1998 | Staendeke et al. |
| 5,980,628 | A | 11/1999 | Hjelmeland et al. |
| 6,007,619 | A | 12/1999 | Laas et al. |
| 6,217,946 | B1 | 4/2001 | Bolind et al. |
| 6,422,734 | B1 | 7/2002 | Sethuraman et al. |
| 6,706,128 | B2 | 3/2004 | Sethuraman |
| 6,783,587 | B2 | 8/2004 | Sethuraman et al. |
| 6,951,586 | B2 | 10/2005 | Nelson et al. |
| 7,056,460 | B2 | 6/2006 | Englert |
| 8,016,961 | B2 | 9/2011 | Martin et al. |
| 2003/0019401 | A1* | 1/2003 | Schwartz et al. ............. 106/772 |
| 2004/0045481 | A1* | 3/2004 | Sethuraman et al. ........ 106/674 |
| 2005/0064203 | A1 | 3/2005 | Nelson et al. |
| 2006/0051595 | A1* | 3/2006 | Gaudeus et al. ........... 428/423.1 |
| 2006/0068186 | A1* | 3/2006 | Leclercq et al. ........... 428/294.7 |
| 2008/0006363 | A1 | 1/2008 | Townsend et al. |
| 2010/0092783 | A1 | 4/2010 | Takahara et al. |

FOREIGN PATENT DOCUMENTS

| | | |
|---|---|---|
| JP | S53145323 A | 12/1978 |
| JP | S 55-095691 A | 7/1980 |
| JP | S 55-140780 A | 11/1980 |
| JP | H 08-511301 A | 11/1996 |
| JP | 2000-086323 A | 3/2000 |
| WO | WO 2007/048667 A1 | 5/2007 |

OTHER PUBLICATIONS

International Search Report for Application No. PCT/US2013/040964 dated Aug. 7, 2013, 3 pages.

English language abstract not found for CN 1788064; however, see English language equivalent U.S. 2006/0051595. Original document extracted from espacenet.com database on Nov. 5, 2015, 14 pages.

ASTM International, Standard Specification for Gypsum Board, C1396/C1396M—Jul. 11, 2011, 8 pages.

T. Aberle et al., "New Approaches to Increase Water Resistance of Gypsum Based Building Materials," Drymix Mortar Yearbook 2010, 11 pages.

Wacker Silicones, Silres BS 94 Masonry Water Repellents, Jan. 3, 2003, 2 pages.

Brochure: The Gypsum Industry, May 18, 2010; 24 pages.

Partial Machine-assisted English translation for JPS 55-095691 extracted from espacenet.com database on Mar. 29, 2017, 2 pages.

Partial Machine-assisted English translation for JPS 55-140780 extracted from espacenet.com database on Mar. 29, 2017, 3 pages.

English language abstract for JPH 08-511301 extracted from espacenet.com database on Mar. 29, 2017, 1 page.

English language abstract and machine-assisted English translation for JP 2000-086323 extracted from espacenet.com database on Mar. 29, 2017, 17 pages.

* cited by examiner

MOISTURE-RESISTANT GYPSUM BOARDS AND SLURRIES FOR MAKING SAME

RELATED APPLICATIONS

This application claims priority to and all the advantages of U.S. Provisional Patent Application Ser. No. 61/646,625, filed May 14, 2012, which is expressly incorporated herein by reference in its entirety.

FIELD OF THE INVENTION

The present invention generally relates to a slurry and to a gypsum board formed from the slurry. More specifically, the present invention relates to a gypsum layer formed from the slurry which is disposed on a cover sheet. The gypsum layer comprises stucco, water, and an isocyanate to form the gypsum board. The isocyanate increases the moisture resistance of the gypsum board.

BACKGROUND

Gypsum board is a composite material made from two cover sheets with a gypsum layer typically sandwiched between the cover sheets. Typically, the gypsum layer is formed from a slurry. Gypsum boards are manufactured for use in a variety of applications with each application having specific performance requirements. The gypsum board, for example, may be applied as a structural building panel. In this application, the gypsum board may be used on internal and external walls of a structure, including areas exposed to water and moisture.

Unfortunately, the gypsum layer of the gypsum board has a tendency to absorb water. For example, the gypsum layer may absorb up to 40 to 50 parts by weight of water based on 100 parts by weight of the gypsum layer when immersed in water at about 70° F. for two hours. Absorption of water by the gypsum layer may reduce the strength of the gypsum board, increase the vulnerability of the gypsum board to microbial growth, and result in delamination of the cover sheets from the gypsum layer.

The industry has attempted to improve moisture resistance by incorporating moisture resistance components such as wax additives and silicone additives into the gypsum board. Although these additives may be effective at improving the moisture resistance of the gypsum board, each additive has its own disadvantages. For example, wax additives are required in large dosages to effectively improve the water resistance of the gypsum board. Silicone additives negatively interact with soap which is used to create voids in gypsum boards and thereby results in increased soap demand during the process. In addition, silicone additives may negatively impact air quality of the environment by increasing VOC emissions, releasing volatile low molecular oligomers and releasing hydrogen gas which is flammable.

Typically, the moisture resistance components are not completely miscible in the slurry which forms the gypsum layer. This incomplete miscibility may negatively impact moisture resistance of the gypsum board.

As such, there remains an opportunity to provide improved moisture-resistant gypsum board.

SUMMARY OF THE INVENTION AND ADVANTAGES

The present invention provides a gypsum board comprising a cover sheet and a gypsum layer disposed on the cover sheet. The gypsum layer comprises the reaction product of stucco, water, and an isocyanate. The isocyanate is liquid at 25° C. and comprises a diphenylmethane diisocyanate.

The present invention further provides a method of manufacturing gypsum board. The method comprises the step of combining the stucco, water, and the isocyanate which is liquid at 25° C. and comprises a diphenylmethane diisocyanate to form a slurry. The method also comprises the step of applying the slurry to the cover sheet to form the gypsum layer on the cover sheet.

The present invention still further provides a gypsum board comprising a cover sheet and a gypsum layer disposed on the cover sheet. The gypsum layer comprises the reaction product of stucco, water, and, an isocyanate. The reaction product is in the presence of an emulsifying agent for increasing miscibility of the isocyanate with the water. The emulsifying agent is selected from the group of sulfates, sulfonates, and a combination thereof.

The isocyanate improves the physical properties of the gypsum board. More specifically, the isocyanate reacts with the water to form polyurea. The polyurea increases moisture resistance of the gypsum layer. In addition, the emulsifying agent increases miscibility of the isocyanate with the water which thereby increases formation of the polyurea.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The present invention provides a gypsum board 10. The gypsum board 10 is also commonly referred to in the art as drywall, plasterboard, gypsum wallboard, wallboard, etc. The gypsum board 10 is not limited to any particular use, i.e., the gypsum board 10 may be used for walls, ceilings, floors, tile-bases, soffits, etc. The gypsum board 10 is described further below.

The gypsum board 10 comprises a gypsum layer 12. The gypsum layer 12 is also referred to in the art as a gypsum core. Typically, the gypsum layer 12 is manufactured and manipulated to have a conventional thickness, such as a thickness of less than 1, alternatively from about ⅛ to about ¾, or alternatively from about ¼ to about ⅝, inch, or any range between the lowest and highest of these values. Although not required, the gypsum layer 12 may comprise a plurality of voids to reduce the weight of the gypsum layer 12.

The gypsum layer 12 comprises the reaction product of stucco, water, and an isocyanate. The gypsum layer 12 may also comprise one or more additive components. In certain embodiments, the gypsum layer 12 consists essentially of the reaction product of stucco, water, and an isocyanate. Examples of suitable additive components are described and exemplified further below.

The stucco comprises a plurality of pores and may also be referred to in the art as calcium sulfate hemihydrate ($CaSO_4 \cdot 0.5H_2O$), calcined gypsum, or plaster of Paris. The stucco is capable of reacting with water, thereby forming a reaction product comprising calcium sulfate dihydrate ($CaSO_4 \cdot 2H_2O$), which may also be referred to in the art as gypsum. Since the hydration state of calcium sulfate may vary or be unknown at a given instance in time, e.g. during a reaction between calcium sulfate hemihydrate ($CaSO_4 \cdot 0.5H_2O$) and water, these terms are sometimes used inconsistently and, therefore, interchangeably in the art. As used herein, "stucco" is calcium sulfate hemihydrate ($CaSO_4 \cdot 0.5H_2O$) and "gypsum" is calcium sulfate dihydrate ($CaSO_4 \cdot 2H_2O$). It is to be appreciated that stucco may have a hydration state greater than 0.5 and even a hydration state approaching that of gypsum, i.e. a hydration state of about 2.

The present invention is not limited to any particular type of stucco. Examples of suitable stucco, as well as sources, and reactions for obtaining the stucco, are described in: U.S. Pat. No. 8,016,961 to Martin et al.; U.S. Pat. No. 6,706,128 to Sethuraman; U.S. Pat. No. 6,422,734 to Sethuraman et al.; and U.S. Pat. No. 6,783,587 to Sethuraman et al.; hereinafter referred to as the incorporated references, the disclosures of which are incorporated herein by reference in their entirety so long as the incorporated disclosure does not conflict with the general scope of the present invention.

The water and the stucco are reacted in a weight ratio of from about 0.5 to about 1.5, alternatively from about 0.75 to about 1.25, or alternatively from about 0.80 to about 1.0, or any range between the lowest and highest of these values. In this reaction, the stucco is rehydrated to its dihydrate state over a fairly short period of time. The actual time required for the reaction generally depends upon the type of calciner employed and the type of gypsum rock that is used to form the stucco (e.g., as described in the incorporated references). The reaction time may be controlled to a certain extent by the use of additive components such as accelerators and retarders, which are described further below. The reaction gives off heat, i.e., the reaction is exothermic. During the reaction, the gypsum layer 12 will generally transition from a fluid state to a hard or "set" state as the (hydration) reaction product forms/sets. The gypsum layer 12 is commonly referred to as a slurry when in the fluid state. The gypsum layer 12 will generally become set (i.e., less fluid or stiff) after about 15 seconds to about 40 seconds. This may be referred to in the art as a stiffening phase. After setting, the gypsum layer 12 may be cut into various lengths.

The stucco may be used in various amounts to form the gypsum in the gypsum layer 12. The amount of gypsum that is present in the gypsum layer 12 will depend on the desired thickness of the gypsum board 10. For example, when a ½ inch thick gypsum board 10 is desired, the gypsum layer 12 will typically contain gypsum in an amount of from about 337 to about 1180, alternatively about 548 to about 970, or alternatively about 674 to about 843, lbs per 1000 square feet (msf), or any range between the lowest and highest of these values. The amounts of gypsum given in msf may be applied to and adjusted for various thicknesses of the gypsum layer 12. For example, for a ⅝ inch thick board, the gypsum layer 12 will typically contain gypsum in an amount of from about 1785 to about 2040 lbs/msf. General dimensions and manufacturing methods of gypsum board 10 are described further below.

In certain embodiments, there is an excess of the water, relative to the stucco. The isocyanate reacts with the excess of water to form a polymer matrix in the gypsum layer 12 for increasing moisture resistance of the gypsum board 10. The polymer matrix is dispersed throughout the slurry which forms the gypsum layer 12 during the stiffening phase of the gypsum layer 12. Once the gypsum layer 12 has transitioned to the set state, dispersion of the polymer matrix within the gypsum layer 12 is hindered. As such, significant agitation of the slurry, which forms the gypsum layer 12 during the fluid state, is important to promote the reaction between the isocyanate and water to form the polymer matrix. Significant agitation also ensures complete dispersion of the polymer matrix in the gypsum layer 12.

The polymer matrix typically comprises polyurea. Generally, polyurea is formed from the reaction product of an isocyanate and an amine. In the present invention, a first portion of the isocyanate reacts with a portion of the water to form the amine. More specifically, the first portion of isocyanate reacts with the portion of water to form carbamic acid. The carbamic acid is unstable and, therefore, readily decomposes to form carbon dioxide and the amine. The amine reacts with a second portion of the isocyanate to form polyurea. The polyurea extends through the gypsum layer 12 into the voids in the gypsum layer 12 and the pores in the gypsum to inhibit water from migrating therein. As such, the polyurea increases the moisture resistance of the gypsum board 10. It is to be appreciated that the polyurea may be added, as an additive, to the gypsum layer 12 in addition to, or as an alternative to the polyurea formed from the isocyanate reacting with the water.

In various embodiments, the slurry which forms the gypsum layer 12 is substantially free of a polyol. The terminology "substantially free", as used herein with reference to the polyol, refers to the slurry comprising less than 5, alternatively less than 1, alternatively less than 0.1, parts by weight, each based on 100 parts by weight of the slurry, or any range between the lowest and highest of these values, so long as the polyol does not have a substantial effect on the gypsum layer 12. Typically, in the presence of the polyol, the isocyanate may react with the polyol to form a polymer matrix comprising polyurethane rather than polyurea. As discussed previously, polyurea increases the moisture resistance of the gypsum layer 12. As such, the slurry substantially free of the polyol may permit the isocyanate to react with the water to form the polymer matrix comprising polyurea.

The isocyanate may comprise any isocyanate known in the art. The isocyanate may comprise mono-, di-, tri-, tetra-isocyanates, polymeric polyisocyanates, modified isocyanates and other aromatic, aliphatic, and cycloaliphatic polyisocyanates, or combinations thereof. In certain embodiments, the isocyanate is selected from the group of an isocyanate which is liquid at 25° C. and has a dynamic viscosity of from about 1 to about 2500 cps at 25° C., an isocyanate which is solid at 25° C., and a combination thereof. Examples of suitable isocyanates which are liquid at 25° C. include phenyl isocyanates, cyclohexyl isocyanate, 2,2'-diphenylmethane diisocyanate, 2,4'-diphenylmethane diisocyanate, 2,4-toluene diisocyanate, 2,6-toluene diisocyanate, 1,6-hexamethylene diisocyanate, isophorone diisocyanate, uretonimine-modified isocyanate, carbodiimide-modified isocyanate and polymethylene polyphenylene polyisocyanate. Examples of suitable isocyanates which are solid at 25° C. include 4,4'-diphenylmethane diisocyanate, m-phenylene diisocyanate, cyclohexane-1,4-diisocyanate, naphthalene-1,5 diisocyanate.

In various embodiments, the isocyanate comprises a diphenylmethane diisocyanate (MDI). The isocyanate comprising a MDI may be selected from the group of 2,4'-diphenylmethane diisocyanate (2,4'-MDI), a modified isocyanate different from the 2,4'-MDI, polymethylene polyphenyl polyisocyanate (PMDI), and combinations thereof. In these embodiments, the isocyanate may further comprise 4,4'-diphenylmethane diisocyanate (4,4'-MDI).

In other embodiments, the isocyanate is selected from the group of 2,4'-MDI, 4,4'-MDI, a modified isocyanate different from the 2,4'-MDI and the 4,4'-MDI, PMDI, and combinations thereof.

The modified isocyanate may comprise a uretonimine. The modified isocyanate comprising a uretonimine is hereinafter referred to as uretonimine-modified isocyanate. Uretonimine-modified isocyanates are also known as carbodiimide-modified isocyanates in the art.

Typically, customers choose an isocyanate based on cost, physical form and performance. For example, isocyanates in the liquid form, such as 2,4'-MDI, PMDI, and the modified isocyanate, are easier to transport. However, isocyanates, such as 4,4'-MDI and PMDI are more cost effective than 2,4'-MDI and the modified isocyanate, while 2,4'-MDI and the modified isocyanate provide more improved moisture resistance of the gypsum layer 12.

Other examples of suitable isocyanates include hexahydrotoluene diisocyanate, hydrogenated diphenylmethane diisocyanate, tetramethylene diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-diphenylmethane-4,4'-diisocyanate, tetramethylxylylene diisocyanate, 4,4',4"-triphenylmethane triisocyanate, toluene 2,4,6-triisocyanate, 4,4'-dimethyldiphenylmethane-2,2', 5,5'-tetraisocyanate, and modified isocyanates including isocyanates comprising, but not limited to, ureas, biurets, allophanates, and isocyanurate and/or urethane groups including diisocyanates and/or polyisocyanates such as modified diphenylmethane diisocyanates.

Non-limiting examples of suitable isocyanates are commercially available from BASF Corporation of Florham Park, N.J., under the trade names Lupranate® and Lupranat®, such as Lupranate® M, Lupranate® MI, Lupranate® MM103, Lupranate® M20, Lupranate® M70L and Lupranat® ME.

The isocyanate may have any % NCO content known in the art but typically has a % NCO of from 8 to 48 percent by weight as determined using a standard chemical titration analysis known to those skilled in the art. Also, the isocyanate may have any nominal functionality but typically has a nominal functionality of from 1.7 to 3. Further, the isocyanate may have any number average molecular weight but typically has a number average molecular weight of from 125 to 525 g/mol. Still further, the isocyanate which is liquid may have any viscosity but typically has a viscosity of from 1 to 2500 cps at 25° C.

The isocyanate may be reacted in an amount of from about 0.1 to about 10, alternatively from about 0.1 to about 7, alternatively from about 0.1 to about 5, or alternatively from about 7 to about 9, parts by weight, each based on 100 parts by weight of the stucco, or any range between the lowest and highest of these values.

In one embodiment, the isocyanate comprises the 2,4'-MDI and the 4,4'-MDI with the 2,4'-MDI present in an amount of from about 10 to about 55 parts by weight based on 100 parts by weight of the isocyanate, or any range between the lowest and highest of these values, and the 4,4'-MDI present in an amount of from about 45 to about 90 parts by weight based on 100 parts by weight of the isocyanate, or any range between the lowest and highest of these values.

In another embodiment, the isocyanate comprises the modified isocyanate and the 4,4'-MDI with the modified isocyanate present in an amount of from about 15 to about 35 parts by weight based on 100 parts by weights of the isocyanate, or any range between the lowest and highest of these values, and the 4,4'-MDI present in an amount of from about 65 to about 85 parts by weight based on 100 parts by weight of the isocyanate, or any range between the lowest and highest of these values.

In yet another embodiment, the isocyanate comprises the PMDI and the 4,4'-MDI with the PMDI present in an amount of from about 30 to about 75 parts by weight based on 100 parts by weight of the isocyanate, or any range between the lowest and highest of these values, and the 4,4'-MDI present in an amount of from about 20 to about 70 parts by weight based on 100 parts by weight of the isocyanate, or any range between the lowest and highest of these values. The terminology "present", as used herein with reference to the amounts in the isocyanate, may be prior to the formation of the reaction product, during the reaction, or after formation of the reaction product.

In embodiments where the isocyanate is liquid at 25° C., the gypsum layer 12 comprises the reaction product of water, stucco, and an isocyanate which is liquid at 25° C. and comprises MDI. In these embodiments, the isocyanate has a dynamic viscosity of from about 1 to about 2500, alternatively from about 100 to about 2500, or alternatively from about 10 to about 60, cps at 25° C., or any range between the lowest and highest of these values.

In these certain embodiments where the isocyanate is liquid at 25° C., the isocyanate is selected from the group of 2,4'-MDI, the modified isocyanate different from the 2,4'-MDI, PMDI, and combinations thereof. As described above, the modified isocyanate may comprise the uretonimine. The 2,4'-MDI and the modified isocyanate are liquid at 25° C. and have dynamic viscosities of from about 10 to about 60 cps at 25° C., or any range between the lowest and highest of these values. The PMDI is liquid at 25° C. and has a dynamic viscosity of from about 100 to about 2500 cps at 25° C., or any range between the lowest and highest of these values.

In addition, as stated above, the isocyanate may further comprise the 4,4'-MDI. Isocyanates comprising the 2,4'-MDI and the 4,4'-MDI may be liquid at 25° C. with the 2,4'-MDI present in an amount of from about 10 to about 55 parts by weight based on 100 parts by weight of the isocyanate, or any range between the lowest and highest of these values, and the 4,4'-MDI present in an amount of from about 45 to about 90 parts by weight based on 100 parts by weight of the isocyanate, or any range between the lowest and highest of these values.

Isocyanates comprising the modified isocyanate and the 4,4'-MDI may also be liquid at 25° C. with the modified isocyanate present in an amount of from about 15 to about 35 parts by weight based on 100 parts by weights of the isocyanate, or any range between the lowest and highest of these values, and the 4,4'-MDI present in an amount of from about 65 to about 85 parts by weight based on 100 parts by weight of the isocyanate, or any range between the lowest and highest of these values.

Isocyanates comprising the PMDI and the 4,4'-MDI may also be liquid at 25° C. with the PMDI present in an amount of from about 30 to about 75 parts by weight based on 100 parts by weight of the isocyanate, or any range between the lowest and highest of these values, and the 4,4'-MDI present in an amount of from about 20 to about 70 parts by weight based on 100 parts by weight of the isocyanate, or any range between the lowest and highest of these values.

In various embodiments, the gypsum layer 12 comprises the reaction product of the stucco, water, and the isocyanate in the presence of an emulsifying agent for increasing miscibility of the isocyanate with the water. In certain embodiments, the gypsum layer 12 consist essentially of the reaction product of the stucco, water, and the isocyanate in the presence of the emulsifying agent for increasing miscibility of the isocyanate with the water. The emulsifying agent may increase the miscibility of the isocyanate with the water by any number of chemical and physical reactions between the isocyanate, the water and, the emulsifying agent. Typically, the emulsifying agent has a lipophilic portion and a hydrophilic portion. In general, the lipophilic portion of the emulsifying agent aligns towards the isocyanate and the hydrophilic portion of the emulsifying agent aligns opposite the isocyanate towards the water to form a micelle around the isocyanate. As such, the micelle formed from the emulsifying agent decreases the interfacial tension between the isocyanate and the water. This decrease in interfacial tension promotes a better reaction between the isocyanate and water to form the polymer matrix and ensures complete dispersion of the polymer matrix in the gypsum layer 12. Accordingly, the emulsifying agent may increase moisture resistance of the gypsum layer 12 in combination with the isocyanate.

The emulsifying agent is selected from the group of sulfates, sulfonates, and a combination thereof. Specific examples of suitable emulsifying agents, for purposes of the present invention, include those comprising: ammonium ether sulfates; ammonium alkyl sulfates; alkyl ether sulfates having at least an average of 1.5 moles of ethylene oxide per mole of emulsifying agent, alkyl ether sulfates having at least an average of 4.0 moles of ethylene oxide per mole of emulsifying agent; a sulfonate ethoxylated molecule with a C-8 to C-12 chain, for example, having an average of 4.0 moles of ethylene oxide per mole of emulsifying agent; alkyl aryl sulfonates, C-12 to C-16 alpha sulfonated methyl esters, alpha olefin sulfonates, and mixtures thereof; alkyl ether sulfates having on average between 1.5 and 2.5 moles of ethylene oxide per mole of emulsifying agent, sodium dodecylbenzenesulfonate, and triethanolamine dodecylbenzene sulfonate; a emulsifying agent described by the chemical formula $CH_3(CH_2)_bCH_2(OCH_2CH_2)_cOSO_3M_2$, wherein b has an average value in the range of 6.5 and 7.5; wherein c is the average number of moles of ethylene oxide per mole of emulsifying agent and is in the range of 1.5 and 2.5; and $M_2$ is selected from the group consisting of sodium, potassium, magnesium, ammonium, quaternary ammonium, and mixtures thereof; or wherein c is approximately 2.2, and $M_2$ is selected from the group consisting of sodium, ammonium, and quaternary organic derivatives of ammonium. It is to be appreciated that any number of emulsifying agent may be used to increase the miscibility of the isocyanate with the water. Non-limiting examples of suitable emulsifying agents are commercially available from Stepan Company of Northfield, Ill. under the trade name Cedepal®, such as Cedepal® FA-406, from Thatcher Chemical Company of Salt Lake City, Utah under the trade name Thatcher, such as Thatcher TF, and from Geo Specialty Chemicals of Lafayette, Ind. under the trade name Hyonic® PFM, such as Hyonic® PFM 30.

Further specific examples of suitable emulsifying agents, for purposes of the present invention, include those comprising: alkyl sulfates having at least a ten carbon chain, alkyl ether sulfates having less than an average of 1.3 moles of ethylene oxide per mole of emulsifying agent, and mixtures thereof; ammonium lauryl sulfate, and alkyl ether sulfates having approximately 0.4 to 1.3 moles of ethylene oxide per mole of emulsifying agent; a emulsifying agent described by the chemical formula $R(OCH_2CH_2)_aOSO_3M_1$, wherein R represents linear and branched hydrocarbons having a maximum molecular weight of about 169, and mixtures thereof; wherein a is the average number of moles of ethylene oxide per mole of emulsifying agent and is in the range of 0.4 and 1.3, and $M_1$ is selected from the group consisting of sodium, potassium, magnesium, ammonium, quaternary organic derivatives of ammonium, and mixtures thereof; or wherein a is approximately 0.8, and $M_1$ is selected from the group consisting of ammonium and quaternary organic derivatives thereof. Non-limiting examples of suitable emulsifying agents are commercially available from Stepan Company of Northfield, Ill. under the trade name Alpha Foamer®.

The emulsifying agent typically comprises a one or more solvents. In addition, the emulsifying agent is typically anionic; however, it is to be appreciated that the emulsifying agent may also be cationic, nonionic, amphoteric, zwitterionic, etc. The solvent is typically water (such that the solution is aqueous), an alcohol (e.g. ethanol, isopropanol, etc.), or a combination thereof. The emulsifying agent typically comprises from about 30 to about 60 parts by weight of an active emulsifying agent component(s) based on 100 parts by weight of the emulsifying agent, or any range between the lowest and highest of these values. As described above, the remainder of the emulsifying agent may be the solvent (e.g. water or alcohol) or a combination of the solvents.

The emulsifying agent may be used in various amounts. Typically, the emulsifying agent is present in an amount of from about 0.1 to about 2 lbs per 1000 square feet (msf) of the gypsum layer 12 (or of from about 0.5 to about 10 kg per 1000 square meters of the gypsum layer 12), alternatively from about 0.4 to about 1.25 lbs/msf of the gypsum layer 12, or alternatively from about 0.5 to about 0.9 lbs/msf of the gypsum layer 12, or any range between the lowest and highest of these values. It is to be appreciated that the emulsifying agent may comprise a combination or two or more of the aforementioned emulsifying agents. In certain embodiments, the gypsum layer 12 includes one emulsifying agent. In other embodiments, the gypsum layer 12 includes two or more different emulsifying agents.

In embodiments where the emulsifying agent is employed, the isocyanate may be either a liquid or a solid at 25° C. In these embodiments, the isocyanate may be selected from the group of an isocyanate which is liquid at 25° C. and has a dynamic viscosity of from about 1 to about 2500 cps at 25° C. or any range between the lowest and highest of these values, an isocyanate which is solid at 25° C., and a combination thereof.

Typically, where the emulsifying agent is employed, the isocyanate may be selected from the group of 2,4-MDI, 4,4'-MDI, a modified isocyanate different from the 2,4'-MDI and the 4,4'-MDI, PMDI, and combinations thereof. As stated above, the modified isocyanate may comprise the uretonimine. Because the emulsifying agent promotes better miscibility of the isocyanate with the water, the amount of isocyanate required to increase moisture resistance of the gypsum layer 12 is less. Said differently, in embodiments where the emulsifying agent is employed, the amount of isocyanate in the gypsum layer 12 may be less than the amount of isocyanate in embodiments where no emulsifying agent is present for increasing moisture resistance of the gypsum layer 12. In embodiments where the emulsifying agent is employed, the isocyanate may be reacted in an amount of from about 0.1 to about 7, alternatively from about 0.1 to about 6, or alternatively from about 0.1 to about 5, parts by weight, each based on 100 parts by weight of the stucco, or any range between the lowest and highest of these values.

In certain embodiments, the isocyanate is reacted with an active hydrogen containing species component to form a prepolymer. It is to be appreciated that the isocyanate may react with the active hydrogen containing species component prior to the isocyanate reacting with the water, during the isocyanate reacting with the water, and/or after the isocyanate reacts with the water. The active hydrogen containing species component may impart additional physical properties to the gypsum layer 12 such as moisture resistance. In further embodiments, the active hydrogen containing species component is selected from the group of a fluorinated alcohol, an organopolysiloxane having at least one hydroxyl-functional group, an amine, and combinations thereof.

The fluorinated alcohol may be any fluorinated alcohol known in the art. The fluorinated alcohol may have a linear or branched structure. The prepolymer formed from the isocyanate reacting with the fluorinated alcohol may impart additional moisture resistance to the gypsum layer 12 in addition to the moisture resistance provided by the polymer matrix formed from the isocyanate reacting with the water. Non-limiting examples of suitable fluorinated alcohols include 2,2,2-trifluoroethanol, 1,1,1,3,3,3-hexafluoro-2-propanol, 2,2,3,4,4,4-hexafluoro-1-butanol, 1,1,1,3,3,3-hexafluoro-2-methyl-2-propanol, 1,1,1,3,3,3-hexafluoro-2-phenyl-2-propanol, 2,2,3,3,4,4-hexafluoro-1,5,-pentanediol, 1,1,1,3,3,4,4,4-octafluoro-2-butanol, 2,2,3,3,4,4,5,5,-octafluoro-1,6-hexanediol, 2,2,3,3,4,4,5,5,octafluoro-1-pentanol, pentafluorophenol, 3,3,4,4,5,5,6,6,7,7,8,8-tridecafluoro-1-octanol, 4-(4,4,5,5,6,6,7,7,8,8,9,9,9-tridecafluorononyloxy)benzyl alcohol, and 4-(3,3,4,4,5,5,6,6,7,7,8,8-tridecafluorooctyl)benzyl alcohol.

The organopolysiloxane may be any organopolysiloxane comprising at least one hydroxyl-functional group known in the art. The organopolysiloxane may have a linear or a rake type structure. The organopolysiloxane having the rake type structure may be hydrolyzable or non-hydrolyzable. The prepolymer formed from the isocyanate reacting with the organopolysiloxane may impart additional moisture resistance to the gypsum layer 12 in addition to the moisture resistance provided by the polymer matrix formed from the isocyanate reacting with the water. Non-limiting examples of suitable organopolysiloxanes are commercially available from Air Products and Chemicals, Inc. of Allentown, Pa., under the trade name Dabco®, such as Dabco® DC193, Dabco® DC2525, Dabco® DC4000, Dabco® DC5043, Dabco® DC5164 and Dabco® DC5258, Dabco® DC5357, Dabco® DC5577, Dabco® DC5582, Dabco® DC5598, Dabco® DC5604, Dabco® DC5943, Dabco® DC5986, and Dabco® DC6070. Further non-limiting examples of suitable organosiloxanes have an OH number greater than 10 and are commercially available from Evonik Industries AG of Parsippany, N.J., under the trade name TEGOSTAB®, such as TEGOSTAB® 8433, TEGOSTAB® 8462, TEGOSTAB® 8465, TEGOSTAB® 8474, TEGOSTAB® 8476, TEGOSTAB® 8484, TEGOSTAB® 8485, TEGOSTAB® 8486, TEGOSTAB® 8488, TEGOSTAB® 8489, TEGOSTAB® 8490, TEGOSTAB® 8491, TEGOSTAB® 8492, TEGOSTAB® 8498, TEGOSTAB® 8511, TEGOSTAB® 8513, TEGOSTAB® 8523, TEGOSTAB® 8526, TEGOSTAB® 8535, TEGOSTAB® 8542, TEGOSTAB® 8570, TEGOSTAB® 8580, TEGOSTAB® 8586, TEGOSTAB® 8587, TEGOSTAB® 8588, TEGOSTAB® 8870, and TEGOSTAB® 9470.

The amine may be any amine known in the art. The amine is selected from the group of a monoamine, a diamine, and a combination thereof. The prepolymer formed from the isocyanate reacting with the amine may impart additional moisture resistance to the gypsum layer 12 in addition to the moisture resistance provided by the polymer matrix formed from the isocyanate reacting with the water. The prepolymer formed from the isocyanate reacting with the amine may also be referred to as an isocyanate-urea hybrid. Non-limiting examples of suitable amines include 4,4'-methylene bis(2-chloroaniline) (MOCA), 4,4'-methylenedianiline (MDA), 4,4'-thiodianiline (TDA) and similar oligomers. Further non-limiting examples of suitable amines are commercially available from UOP of Des Plaines, Ill. under the trade name UNILINK™, such as UNILINK™ 4200, from Albemarle Corporation of Belgium, under the trade name ETHACURE®, such as ETHACURE® 90, ETHACURE® 100, and ETHACURE® 300, and from Bayer Corporation of Pittsburgh, Pa., under the trade name Desmophen®, such as Desmophen® 1220 and Desmophen® 1420.

Typically, the active hydrogen containing species component is reacted in an amount of from about 1 to about 10, alternatively from about 1 to about 4, alternatively from about 4 to about 7, or alternatively from about 7 to about 10, part(s) by weight, each based on 100 parts by weight of isocyanate, or any range between the lowest and highest of these values.

In certain embodiments, the gypsum layer 12 is substantially free of conventional moisture-resistant additives yet is moisture-resistant as defined by ASTM C473 to meet the requirements set forth in ASTM C473. Alternatively, the gypsum layer 12 is substantially free of conventional moisture-resistant additives yet is moisture-resistant as defined by ASTM C1396 to meet the requirements set forth in ASTM C1396. The terminology "substantially free", with respect to the conventional moisture-resistant additives, provides that the gypsum layer 12 comprises no more than 0.5, alternatively no more than 0.4, alternatively no more than 0.3, alternatively no more than 0.2, or alternatively no more than 0.1, parts by weight of the conventional moisture-resistant additives, each based on 100 parts by weight of the gypsum layer 12. Previous attempts in the art to increase the moisture resistance of the gypsum board 10 included conventional moisture-resistant additives such as, silicones and waxes.

In other embodiments, it is to be appreciated that the gypsum layer 12 may include the conventional moisture-resistant additives to increase the moisture resistance of the gypsum layer 12. In these other embodiments, the isocyanate increases the strength of the gypsum layer 12 and, therefore, the conventional moisture-resistant additives are used to further increase the moisture resistance of the gypsum layer 12.

As described above, moistures resistance of the gypsum layer 12 is provided by the polymer matrix formed from the isocyanate reacting with the water. However, miscibility of the isocyanate and dispersion of the polymer matrix may also have a significant effect on the moisture resistance of the gypsum layer 12. As described above, both agitation of and emulsifying agents in the slurry which forms gypsum layer 12 may increase miscibility of the isocyanate and dispersion of the polymer matrix in the gypsum layer 12. As such, agitation and/or emulsifying agents in combination with the isocyanate may further increase the moisture resistance of the gypsum layer 12.

The moisture resistance of the gypsum layer 12 may be evaluated by determining the amount of water absorbed into the gypsum board 10 during immersion of the gypsum board 10 in water for two hours. Typically, the gypsum layer 12 absorbs no more than 20%, alternatively no more than 15%, or alternatively no more than 10%, of water in 2 hours as defined according to ASTM C473. Alternatively, the gypsum layer 12 absorbs no more than 20%, alternatively no more than 15%, or alternatively no more than 10%, of water in 2 hours as defined according to ASTM C1396. Typically, the percentage of water absorbed into the gypsum board 10 is based on weight percent of the gypsum board 10.

The gypsum layer 12 may also include additive components. The additive components may include any additive(s) understood in the art. Examples of suitable additives, for purposes of the present invention, include those described in the incorporated references, as well as coalescing agents, foaming agents, starches, accelerators, fibers (such as paper and/or glass fibers), potash, clay, boric acid, plasticizers, fire retarders, mildew retarders, thickeners, dispersants, or combinations thereof. The additive components may be used in various amounts and may include one or more of the aforementioned additives. Specific amounts of certain additives may be appreciated with reference to the Examples section below. It is to be appreciated that the additives may be used in amounts greater or less than those amounts specifically illustrated therein.

In various embodiments, the gypsum layer 12 is substantially free of cellulose fiber. The terminology "substantially free", with respect to cellulose fiber, provides that the gypsum layer 12 comprises no more than 1, alternatively no more than 0.75, or alternatively no more than 0.5, parts by weight of cellulose fiber, each based on 100 parts by weight of the gypsum layer 12, or any range between the lowest and highest of these values. Typically, cellulose fiber is used for structurally supporting the gypsum layer 12. More specifically, the isocyanate may react with the cellulose fiber in the slurry which forms the gypsum layer 12 to strengthen the gypsum layer 12. However, the isocyanate reacting with the cellulose fiber may compete with the isocyanate reacting with the water to form the polymer matrix. As such, the gypsum layer 12 being substantially free of cellulose fiber may permit the isocyanate to react with the water to form the polymer matrix which increases the moisture resistance of the gypsum layer 12.

In various embodiments, the gypsum layer 12 is substantially free of a supplemental foaming agent yet comprises a plurality of voids in the gypsum layer 12. The terminology, "substantially free", with respect to the supplemental foaming agent, provides that the gypsum layer 12 comprises no more than 1, alternatively no more than 0.5, alternatively no more than 0.25, or alternatively no more than 0.1, parts by weight of the supplemental foaming agent, each based on 100 parts by weight of the gypsum layer 12. The terminology "supplemental" with respect to the supplemental foaming agent, is an addition of a foaming agent for the specific purpose of defining voids in the gypsum layer 12. Other components in the gypsum layer 12 may define voids in the gypsum layer 12 to decrease the weight of the gypsum board 10. These other components include, for example, the water and the emulsifying agent. The carbon dioxide released during the reaction of the isocyanate and water in the gypsum layer 12 may define voids therein. The emulsifying agent may be used to generate foam by any number of conventional foam generating methods. However, it is to be appreciated that the emulsifying agent is not considered a supplemental foaming agent, as described herein. As such, the gypsum layer 12 substantially free of a supplemental foaming agent may comprise voids to decrease the weight of the gypsum layer 12.

In certain embodiments, the gypsum board 10 comprises a cover sheet 14. In further embodiments, the gypsum board 10 may comprise a second cover sheet 14. The cover sheet(s) 14 may be formed from various materials, such as from paper or fiberglass. The cover sheet(s) 14 may be the same as or different than each other, and may be referred to as Face and Back sheets. Examples of suitable cover sheet(s) 14 are described in the incorporated references. Certain types of cover sheet(s) 14 may have additives or make-ups which impart desirable fire or mildew retarding properties.

Figure 1A:
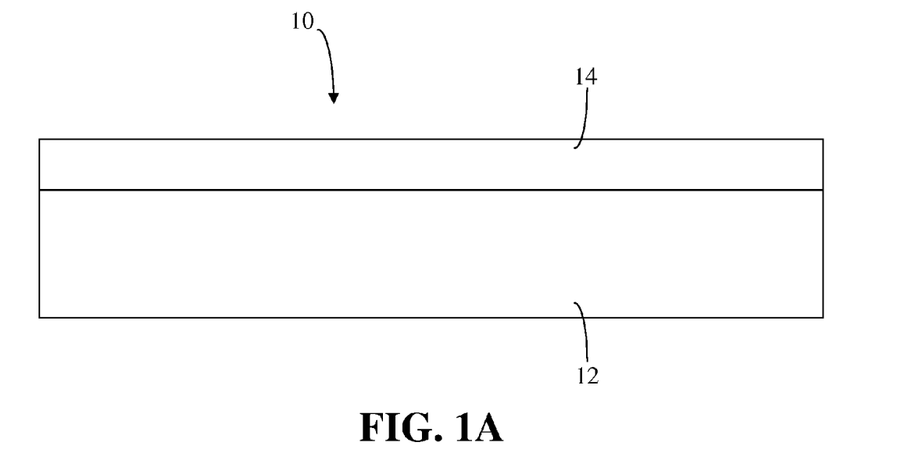
FIG. 1A is a side view of a gypsum board according to this invention illustrating a cover sheet and a gypsum layer.
Figure 1B:
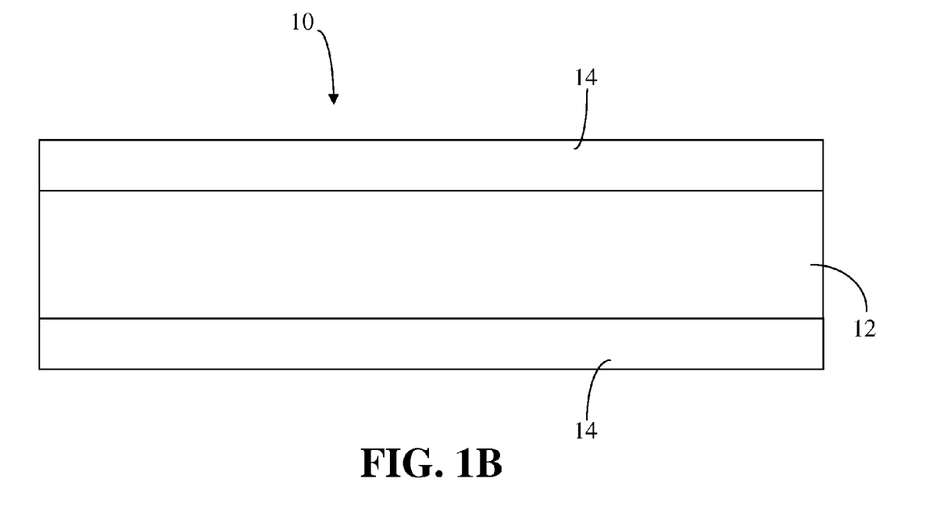
FIG. 1B is a side view of the gypsum board according to this invention illustrating two cover sheets sandwiching the gypsum layer.

As shown in FIG. 1A, the gypsum board 10 may comprise the gypsum layer 12 and the cover sheet 14 with the gypsum layer 12 disposed on the cover sheet 14. As shown in FIG. 1B, a second cover sheet 14 is typically applied to the gypsum layer 12 to form the gypsum board 10. However, the gypsum board 10 may also include just one cover sheet 14 and the gypsum layer 12. The cover sheet(s) 14 may be folded to encapsulate edges of the gypsum layer 12. The gypsum layer 12 is typically sandwiched between the cover sheet(s) 14.

The cover sheet 14 may be bonded to the gypsum layer 12 by conventional methods known in the art. However, conventional moisture-resistant additives, such as silicones and waxes, may migrate through the gypsum layer 12 to the cover sheet(s) 14. This migration may result in delamination of the cover sheet(s) 14 from the gypsum layer 12. Isocyanates may decrease this delamination of the cover sheet(s) 14 from the gypsum layer 12 through the formation of the polymer matrix. The polymer matrix may extend to the cover sheet 14 thereby increasing bonding between the cover sheet 14 and the gypsum layer 12.

Typically, as stated above, the gypsum layer 12 is formed from the slurry. The slurry may be formed by conventional methods understood in the art. Examples of such methods, and apparatuses for forming the slurry, are described in the incorporated references. Typically, the slurry is formed using a mixer and a conveyor. Components of the slurry are provided and added to the mixer. The mixer typically has one or more feeds, such as a feed for dry components, e.g. the stucco, and one or more feeds for wet components, e.g. the water. The components are mixed in the mixer to form the slurry. Each of the components may be added to the mixer at various times and in various combinations.

The present invention provides a method of forming a slurry for a gypsum layer 12 for use in the manufacture of gypsum board 10. The method comprising the steps of providing water, the stucco, and the isocyanate which is liquid at 25° C. and comprises diphenylmethane diisocyanate. The method further comprises the step of reacting the isocyanate and the water to form a composition. The method also comprises the step of reacting the composition and the stucco to form the slurry.

The present invention provides a method of manufacturing gypsum board 10. The method comprising the step of combining water, the stucco, and the isocyanate which is liquid at 25° C. and comprises diphenylmethane diisocyanate to form the slurry. The water, stucco and isocyanate may be combined in any order or by any method known in the art for manufacturing gypsum board. In one embodiment, the step of combining is further defined as reacting the isocyanate and the water to form a composition, and reacting the composition and the stucco to form the slurry. In another embodiment, the step of combining is further defined as reacting the isocyanate and the stucco to form a composition, and reacting the composition and the water to form the slurry. In still another embodiment, the step of combining is further defined as reacting the water and the stucco to form a composition, and reacting the composition and the isocyanate to form the slurry. In yet another embodiment, the step of combining is further defined as reacting the isocyanate, the water, and the stucco to form the slurry.

The method further comprises the step of applying the slurry to the cover sheet 14 to form a gypsum layer 12 on the cover sheet 14. The step of applying the slurry may be performed by any method known in the art for manufacturing gypsum board.

In certain embodiments, the method of manufacturing the gypsum board 10 comprises the step of providing water, the stucco and the isocyanate. The method may further comprise the step of providing the cover sheet 14. It is to be appreciated the steps of combining and/or reaction may include the use of a mixer and/or conveyor. It is also to be appreciated that the method of manufacturing the gypsum board 10 may include the steps of providing, combining, and/or reacting the emulsifying agent prior to forming or during formation of the slurry.

Heat may be applied to the gypsum board 10 to remove residual water from the gypsum layer 12. Methods of removing residual water via heat are understood in the art, such as by employing dryers or drying chambers. As understood in the art, certain dispersants/plasticizers may also be used to reduce the amount of water, hence reducing the eventual drying time/energy needed to produce the gypsum board 10.

The gypsum board 10 may eventually be cut into various lengths. Typically dimensions of the gypsum board 10 include a width of about 48 inches (~120 cm) to about 52 inches (~137 cm), and a thickness of from ¼ inch (~6 mm) to about 1 inch (~25 mm), alternatively about ½ inch (~13 mm) to about ⅝ inch (~16 mm), or alternatively from about ¼ inch to about and ⅜ inch (~10 mm).

The gypsum board 10 may be made with different edges, for example, with two different edge treatments: a tapered edge, where the long edges of the board are tapered with a wide bevel at the front to allow for jointing materials to be finished flush with the main board face; and a plain edge, used where the whole surface will receive a thin coating (skim coat) of finishing plaster. It is to be appreciated that the present invention is not limited to any particular dimension or configuration of the gypsum board 10.

The gypsum board 10 may have various physical properties. The weight of the gypsum board 10 formed from gypsum layer 12 will be dependent on how thick the board is. For example, a ½ inch thick gypsum board 10 typically has a weight of less than about 1500, alternatively from about 1200 to 1400, or alternatively from about 1200 to 1350, lbs/msf.

It is to be appreciated that many changes may be made to the following examples, while still obtaining like or similar results. Accordingly, the following examples, illustrating embodiments of the gypsum layer 12 of the present invention, are intended to illustrate and not to limit the invention.

EXAMPLES

Examples of the gypsum layer 12 are formed from a slurry and evaluated for moisture resistance in a laboratory setting using laboratory method I. Formation of the gypsum layer 12 using the laboratory method I comprises the steps of adding isocyanate to 38 grams of water to form a composition in a plastic beaker, mixing the composition for about 5 to about 10 seconds by hand with a spatula, adding 50 grams of stucco to the composition in the plastic beaker to form the slurry, waiting 30 seconds, mixing vigorously for 60 seconds by hand with the spatula, pouring the slurry through a funnel to form a patty on aluminum foil, baking the patty overnight at 70° C., and cooling the patty to room temperature for 30 minutes to form the gypsum layer 12.

Evaluation of the gypsum layer 12 for moisture resistance using the laboratory method I comprises the steps of weighing the gypsum layer 12 to determine the pre-soak weight, soaking the gypsum layer 12 in deionized water for 2 hours, drying the gypsum layer 12 with a paper towel, and re-weighing the gypsum layer 12 to determine the post-soak weight. Moisture resistance of the gypsum layer 12 using the laboratory method I is evaluated by determining water absorption of the gypsum layer 12. The water absorption is calculated by dividing the pre-soak weight into the post-soak weight and expressing the results as a percent of weight change.

Alternatively, the gypsum layer 12 may be formed from a slurry and evaluated for moisture resistance using laboratory method II. In the laboratory method II, the weight ratio for the water and the stucco is 0.7 to 1.

For liquid isocyanates, formation of the slurry using the laboratory method II comprises the steps of adding the liquid isocyanate to the water to form a liquid composition, and adding stucco to the composition to form the slurry. For solid isocyanates, formation of the slurry using the laboratory method II comprises the steps of the solid isocyanate to the stucco to form a solid composition, and adding water to the solid composition to form the slurry.

Formation of the gypsum layer 12 using the laboratory method II comprises waiting 15 seconds while the slurry soaks, mixing the slurry for 15 second at a fast level, pouring the slurry into a plastic cup with the plastic cup typically containing about 200 grams of the slurry to form a patty, removing the patty from the cup after 15 minutes, drying the slurry at 140° C. for 30 minutes, further drying the slurry at 40° C. for at least two days, and cooling the patty to room temperature for 1 hour to form the gypsum layer 12.

Evaluation of the gypsum layer 12 for moisture resistance using the laboratory method II comprises the steps of weighing the gypsum layer 12 to determine the pre-soak weight, soaking the gypsum layer 12 in water for 2 hours, removing surface water from the gypsum layer 12, and re-weighing the gypsum layer 12 to determine the post-soak weight. Moisture resistance of the gypsum layer 12 using the laboratory method II is evaluated by determining water absorption of the gypsum layer 12. The water absorption is calculated by dividing the pre-soak weight into the post-soak weight and expressing the results as a percent of weight change.

Table I below illustrates the water absorption of several exemplary gypsum layers 12 comprising the reaction product of stucco, water, and isocyanate. These gypsum layers 12 were formed and evaluated using the laboratory method I. However, it is to be appreciated that the water absorption of these gypsum layers 12 would be similar if formed and evaluated using the laboratory method II.

As illustrated in the Table, the gypsum layers 12 comprising the reaction product of from about 4 to about 5 parts by weight of the isocyanate based on 100 parts by weight of the stucco (described as Isocyanate based on Stucco % (w/w) in the Table), water, and stucco absorb no more than 20% of water in 2 hours. All amounts are in parts by weight based on 100 parts by weight of the gypsum layer 12.

TABLE I

| Component | \multicolumn{7}{c}{Example} | | | | | | |
|---|---|---|---|---|---|---|---|
| | 1 | 2 | 3 | 4 | 5 | 6 | 7 |
| Isocyanate based on Stucco % (w/w) | 2.91 | 4.76 | 5 | 2.91 | 4.76 | 2.91 | 4.76 |
| 4,4'-MDI | 0.81 | 1.32 | 2.04 | 1.19 | 1.92 | 0.46 | 0.74 |
| 2,4'-MDI | 0.81 | 1.32 | 0.72 | 0.03 | 0.05 | 0.05 | 0.08 |
| Uretonimine-modified MDI | 0 | 0 | 0 | 0.41 | 0.66 | 0 | 0 |
| PMDI | 0 | 0 | 0 | 0 | 0 | 1.12 | 1.82 |
| Water | 42.48 | 42.04 | 41.99 | 42.48 | 42.04 | 42.48 | 42.04 |
| Stucco | 55.90 | 55.32 | 55.25 | 55.89 | 55.33 | 55.89 | 55.32 |
| Total | 100 | 100 | 100 | 100 | 100 | 100 | 100 |
| Water Absorption (avg. %)[1] | 16.1 | 4.0 | 3.2 | 20.9 | 6.2 | 33.5 | 17.2 |

[1] Values are average water absorptions of repeated experiments. It is to be appreciated that the water absorption for each individual experiment may be higher and/or lower than the average water absorption of each example.

The isocyanate in examples 1 and 2 comprise 50 parts by weight of 4,4'-MDI and 50 parts by weight of 2,4'-MDI, each based on 100 parts by weight of the isocyanate, and is commercially available from BASF Corporation as Lupranate® MI.

The isocyanate in example 3 comprises 74 parts by weight of 4,4'-MDI and 26 parts by weight of 2,4'-MDI, each based on 100 parts by weight of the isocyanate, and is commercially available from BASF Corporation as Lupranate® M and Lupranate® MI.

The isocyanate in examples 4 and 5 comprise 73 parts by weight of 4,4'-MDI, 2 parts by weight of 2,4'-MDI, and 25 parts by weight of uretonimine-modified isocyanate, each based on 100 parts by weight of the isocyanate, and is commercially available from BASF Corporation as Lupranate® MM103.

The isocyanate in examples 6 and 7 comprise 28 parts by weight of 4,4'-MDI, 3 parts by weight of 2,4'-MDI, and 69 parts by weight of PMDI, each based on 100 parts by weight of the isocyanate, and is commercially available from BASF Corporation as Lupranate® M70L.

It is to be appreciated that the moisture resistance of the gypsum layer 12 formed using the laboratory method I in the laboratory setting may not be representative of the moisture resistance of a gypsum layer 12 formed using conventional methods in a production setting. More specifically, the gypsum layer 12 formed using the laboratory method I is absent the cover sheet 14, the emulsifying agent, and the additive components. The cover sheet 14 and additive components may further improve the moisture resistance of the gypsum layer 12 in combination with the isocyanate. In addition, the gypsum layer 12 formed using the laboratory method is mixed by hand and formed as a patty whereas the gypsum layer 12 formed in the production setting is agitated by a production grade mixer such as, a Hobart mixer and formed as a sheet. As discussed previously, agitation has a significant impact on the moisture resistance of the gypsum layer 12, and therefore, the gypsum layer 12 mixed by the Hobart mixer may provide improved moisture resistance of the gypsum layer 12. In addition, the gypsum layer 12 formed as a sheet may be more uniform than the gypsum layer 12 formed as the patty, and therefore, the gypsum layer 12 formed as a sheet may provide improved moisture resistance of the gypsum layer 12.

Table II illustrates components of a typical gypsum layer 12, as described above, with the addition of the additive components.

TABLE II

| Component | Typical Range (lbs/msf) |
|---|---|
| Stucco | 1000-1200 |
| Isocyanate | 1-120 |
| Emulsifying Agent | 0.1-2.0 |
| Foaming Agent | 0.5-1.05 |
| Potash | 05-4.0 |
| Accelerator | 7.0-11.0 |
| Starch | 7.0-11.0 |
| Cellulose Ether | 0.01-0.75 |
| Retarder | 0.01-0.3 |
| Dispersant | 2.0-5.0 |
| Water Reducer | 0.5-2.5 |
| Coalescing Agent | 0.01-0.3 |
| Fiberglass | 0.5-1.5 |
| Boric Acid | 0.0-0.8 |
| Water to Stucco (ratio) | 0.5:1-1.5:1 |

Coalescing Agent is an EO/PO reverse block copolymer commercially available from BASF Corporation.

Foaming Agent is an ammonium ether sulfate, commercially available from Stepan Company.

Accelerator is a ball mill accelerator, and is dry fed to the slurry.

Starch is acid modified corn starch and is dry fed to the slurry.

Cellulose ether is ethyl hydroxyethyl cellulose, commercially available from AkzoNobel Corporation. The cellulose ether acts as a thickener and helps control the slurry fluidity. It is dry fed to the slurry.

The water comprises pulp water, gauging water, and foam water. The pulp water may be about 180 lbs/msf, the foam water may range from about 100 lbs/msf to about 525 lbs/msf, and the gauging water may range from about 220 lbs/msf to about 660 lbs/msf.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A gypsum board comprising:
   a cover sheet; and
   a gypsum layer disposed on said cover sheet with said gypsum layer comprising a reaction product of;
   an isocyanate having an isocyanate functionality wherein said isocyanate is liquid at 25° C. and comprises a diphenylmethane diisocyanate;
   water; and
   stucco.

2. The gypsum board of claim 1 wherein there is an excess of said water relative to said stucco and wherein said liquid isocyanate reacts with said excess of said water to form a polymer matrix in said gypsum layer for increasing moisture resistance of said gypsum board.

3. The gypsum board of claim 1 wherein said liquid isocyanate has a dynamic viscosity of from about 1 to about 2500 cps at 25° C.

4. The gypsum board of claim 1 wherein said liquid isocyanate is selected from the group of 2,4'-diphenylmethane diisocyanate, a modified isocyanate different from said 2,4'-diphenylmethane diisocyanate, polymethylene polyphenyl polyisocyanate, and combinations thereof.

5. The gypsum board of claim 4 wherein said liquid isocyanate further comprises 4,4'-diphenylmethane diisocyanate.

6. The gypsum board of claim 5 wherein said 2,4'-diphenylmethane diisocyanate is present in an amount of from about 10 to about 55 parts by weight based on 100 parts by weight of said liquid isocyanate, and said 4,4'-diphenylmethane diisocyanate is present in an amount of from about 45 to about 90 parts by weight based on 100 parts by weight of said liquid isocyanate.

7. The gypsum board of claim 5 wherein said modified isocyanate is present in an amount of from about 15 to about 35 parts by weight based on 100 parts by weights of said liquid isocyanate, and said 4,4'-diphenylmethane diisocyanate is present in an amount of from about 65 to about 85 parts by weight based on 100 parts by weight of said liquid isocyanate.

8. The gypsum board of claim 5 wherein said polymethylene polyphenyl polyisocyanate is present in an amount of from about 30 to about 75 parts by weight based on 100 parts by weight of said liquid isocyanate, and said 4,4'-diphenylmethane diisocyanate is present in an amount of from about 20 to about 70 parts by weight based on 100 parts by weight of said liquid isocyanate.

9. The gypsum board of claim 1 wherein said liquid isocyanate is reacted in an amount of from about 0.1 to about 10 parts by weight based on 100 parts by weight of said stucco.

10. The gypsum board of claim 1 wherein said liquid isocyanate is reacted with an active hydrogen containing species component in an amount of from about 1 to about 10 parts by weight based on 100 parts by weight of said liquid isocyanate to form a prepolymer.

11. The gypsum board of claim 1 wherein said gypsum layer is substantially free of a supplemental foaming agent yet comprises a plurality of voids in said gypsum layer.

12. The gypsum board of claim 1 wherein said gypsum layer absorbs no more than 20% of water in 2 hours as defined according to ASTM C473.

13. The gypsum board of claim 12 wherein said gypsum layer is substantially free of conventional moisture-resistant additives yet is moisture-resistant as defined by ASTM C473.

14. The gypsum board of claim 1 wherein said gypsum layer is substantially free of cellulose fiber.

15. A gypsum board comprising a cover sheet and a gypsum layer disposed on the cover sheet, said gypsum layer comprising a reaction product of:
   an isocyanate having an isocyanate functionality;
   water; and
   stucco;
   in the presence of an emulsifying agent for increasing miscibility of said isocyanate with said water;
   wherein said emulsifying agent is selected from the group of sulfates, sulfonates, and combinations thereof.

16. The gypsum board of claim 15 wherein there is an excess of said water relative to said stucco and wherein said isocyanate reacts with said excess of said water to form a polymer matrix in said gypsum layer for increasing moisture resistance of the gypsum board.

17. The gypsum board of claim 15 wherein said isocyanate is selected from the group of an isocyanate which is liquid at 25° C. and has a dynamic viscosity of from about 1 to about 2500 cps at 25° C., an isocyanate which is solid at 25° C., and a combination thereof.

18. The gypsum board of claim 15 wherein said isocyanate is selected from the group of 2,4'-diphenylmethane diisocyanate, 4,4'-diphenylmethane diisocyanate, a modified isocyanate different from said 2,4'-diphenylmethane diisocyanate and said 4,4'-diphenylmethane diisocyanate, polymethylene polyphenyl polyisocyanate, and combinations thereof.

19. The gypsum board of claim 15 wherein said isocyanate is reacted in an amount of from about 0.1 to about 7 parts by weight based on 100 parts by weight of said stucco.

20. The gypsum board of claim 15 wherein said emulsifying agent comprises ammonium ether sulfate.

21. The gypsum board of claim 15 wherein said emulsifying agent is present in an amount of from 0.1 to about 2 pounds (lbs) per 1000 square feet (msf) of said gypsum layer.

22. A method of manufacturing gypsum board, said method comprising the steps of:

combining water, stucco, and an isocyanate having an isocyanate functionality wherein the isocyanate is liquid at 25° C. and comprises diphenylmethane diisocyanate to form a slurry, wherein the slurry comprises a reaction product of; the isocyanate having the isocyanate functionality, the water, and the stucco; and applying the slurry to a cover sheet to form a gypsum layer on the cover sheet.

23. The method of claim 22 wherein there is an excess of the water relative to the stucco and wherein the liquid isocyanate reacts with the excess of the water to form a polymer matrix in the gypsum layer for increasing moisture resistance of the gypsum board.

24. The method of claim 22 wherein the step of combining is further defined as:

reacting the liquid isocyanate and the water to form a composition; and reacting the composition and the stucco to form the slurry.

* * * * *